United States Patent
Kolhagen

[11] 3,720,864
[45] Mar. 13, 1973

[54] STEP MOTOR CONTROL CIRCUIT

[72] Inventor: Walter Kolhagen, 818 Oakley Ave., Elgin, Ill. 60120

[22] Filed: May 6, 1970

[21] Appl. No.: 35,066

[52] U.S. Cl. ............... 318/138, 318/439, 318/696, 310/156, 310/172
[51] Int. Cl. ............................................ H02k 29/00
[58] Field of Search ...... 310/156, 172; 318/254, 138, 318/691, 685, 439

[56] References Cited

UNITED STATES PATENTS

| | | | |
|---|---|---|---|
| 3,404,324 | 10/1968 | Gerard | 318/696 |
| 3,453,514 | 7/1969 | Raues et al. | 318/138 |
| 3,560,829 | 2/1971 | Brennan | 318/599 |
| 2,870,388 | 1/1959 | Thomas | 318/138 |
| 3,461,367 | 8/1969 | Takeyasu et al. | 318/138 |
| 3,290,573 | 12/1966 | Kamens | 318/681 |
| 3,448,359 | 6/1969 | Engel | 318/681 |
| 2,753,501 | 7/1956 | Brailsford | 318/254 |
| 3,375,422 | 3/1968 | Bodigues | 318/254 X |
| 3,041,487 | 6/1962 | Hurst | 310/172 |
| 2,968,755 | 1/1961 | Baermann | 318/254 |
| 3,042,847 | 7/1962 | Welch | 318/254 |
| 3,402,337 | 9/1968 | Malmborg et al. | 318/254 |
| 3,370,189 | 2/1968 | Haydon et al. | 310/172 X |

*Primary Examiner*—G. R. Simmons
*Attorney*—Lowe and King

[57] ABSTRACT

A permanent magnet step motor rotor is driven in response to oppositely directed magnetic fluxes coupled by a magnetic core to the rotor. The flux in one direction is derived by selectively feeding D.C. current in one direction through a winding means on the core and a transistor emitter collector path while a switch is open circuited to forward bias the transistor base emitter junction. Flux in the other direction is derived by closing the switch and thereby back biasing the transistor so that D.C. current flows in the winding means in the opposite direction. The rotor is locked in place under steady state conditions with a D.C. current derived from the circuit including the transistor and switch. The steady state current is less than the current required to drive the rotor and is maintained at the lower level by including capacitors in bias circuits for the transistor. To drive the rotor in response to changing magnetic fluxes there may be provided either shading rings, extended, segmented core pole faces, or a rotor having major and minor permanent magnet poles. To provide balanced magnetic flux in opposite magnetic core pole faces coupling flux to the rotor a low resistivity slotted ring is provided.

18 Claims, 13 Drawing Figures

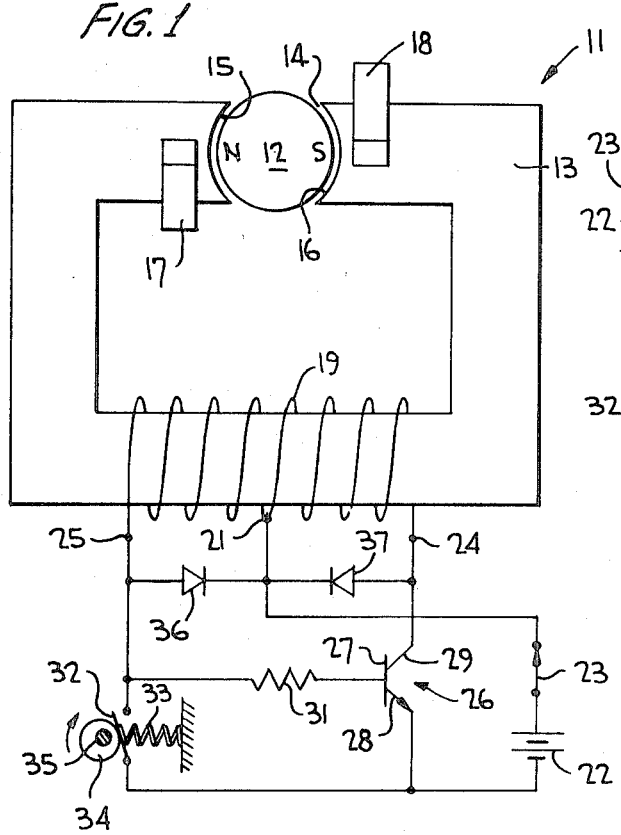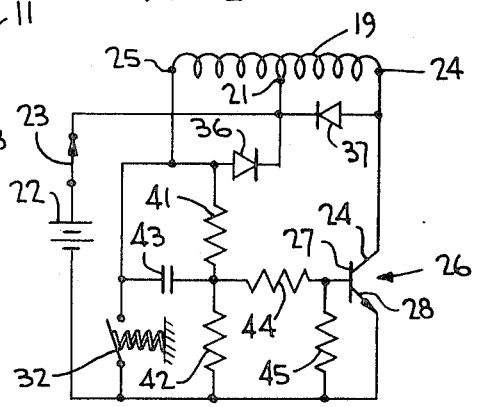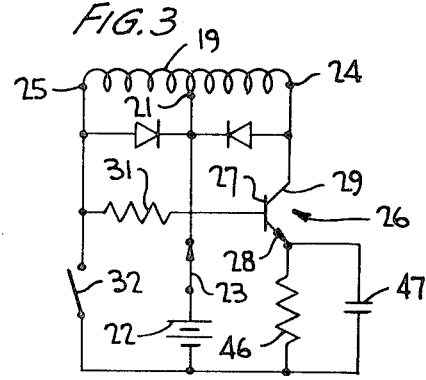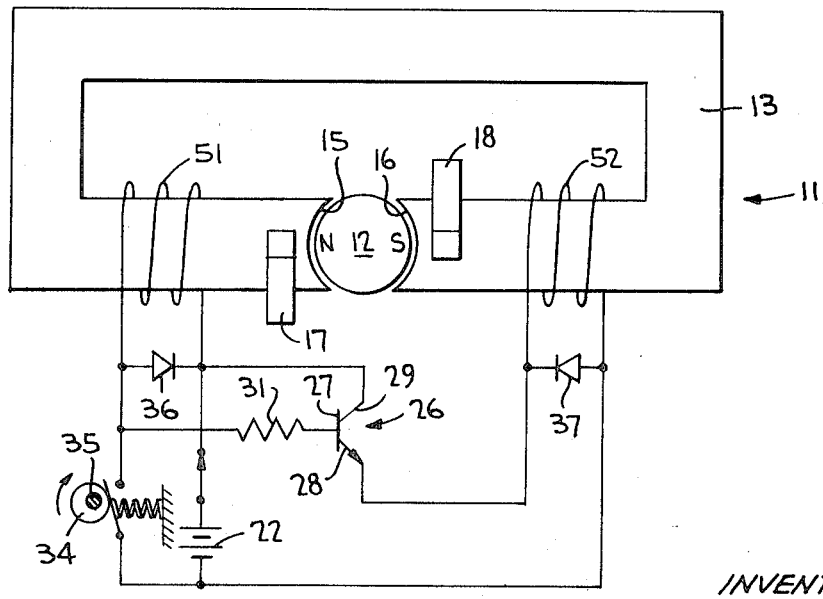

INVENTOR,
WALTER KOLHAGEN

BY

Lowe & King
ATTORNEYS

PATENTED MAR 13 1973 3,720,864

INVENTOR,
WALTER KOLHAGEN

BY
Lowe & King
ATTORNEYS

STEP MOTOR CONTROL CIRCUIT

The present invention relates generally to step motors having permanent magnet rotors. More particularly, in one aspect, the invention relates to a permanent magnet rotor step motor excitation circuit feeding currents to a motor excitation winding to induce oppositely directed rotor stepping and braking magnetic fluxes in a core magnetically coupled with the rotor. In another aspect, the invention relates to permanent magnet rotor step motors wherein a low resistivity strap is responsive to unequal magnetic fluxes flowing through pole faces of the core to equalize the flux in the pole faces.

In the prior art there exist numerous stepping motors of the permanent magnet rotor type wherein the rotor is stepped in response to a switch being opened and closed to sequentially couple a magnetic field to the rotor. The prior art permanent magnet rotor step motors generally include a magnetic core having either a permanent magnet or electromagnet to brake the rotor after the rotor has been stepped in response to a magnetic field induced in the core by a current pulse fed to a coil on the core. The current pulse supplied to the core produces a magnetic flux of sufficient magnitude to overcome the braking effects of the permanent magnet, either by a bucking action, as disclosed in my U.S. Pat. No. 3,423,716, or by overpowering a steady state magnetic field produced by either a permanent magnet or electromagnet, as disclosed in U.S. Pat. No. 3,370,189 to Haydon. Prior art step motors of the defined class also generally include an air gap in the core thereof to maintain the field required for braking and to provide magnetic field reluctance balancing for an air gap existing between pole faces of the core and the permanent magnet rotor. An air gap in the core causes ineffiency in coupling switching flux to the rotor due to the high reluctance path created thereby.

In accordance with the present invention a permanent magnet rotor step motor is braked without the need for means to establish a D.C. braking field with a permanent magnet or electromagnet and the requirement for core air gaps is eliminated. A step motor of this type is achieved, in accordance with the present invention, by employing a unique drive circuit for the winding means of the step motor core. The drive circuit excites the winding while the rotor is stationary to brake the rotor. To step the rotor, current is supplied by the drive circuit to the coil in opposite directions, to induce oppositely directed fluxes in the core and rotor. In response to each transition of the core and rotor flux, the rotor is stepped. The drive circuit includes a voltage responsive switch, preferably of the solid state or transistor type, connected in series with at least a portion of the winding. The switch includes a voltage responsive control electrode that is selectively forward and back biased to control conduction through the switch and the direction of D.C. current applied to the winding. The bias voltage is responsive to a control switch so that the rotor is driven twice each time the control switch is opened and closed.

In accordance with one aspect of the invention a single transistor and a winding having a pair of segments control the direction of flux flow in the magnetic core. In accordance with another arrangement, a single winding is connected to be responsive to alternate conductions through pairs of complementary transistors. The arrangement employing a single transistor and split winding segments is characterized by its simplicity and minimum number of components, while the arrangement employing pairs of complementary transistors is highly efficient as the entire winding or coil is utilized to produce magnetic fluxes in opposite directions.

A further feature of the invention is that the steady state magnetic braking flux applied to the rotor is derived in response to a relatively low current level, while a high current level required to drive the permanent magnet rotor is achieved only under transient conditions. Thereby, efficiency of the unit is enhanced because the current required for locking the rotor in place is minimized and the required current for driving the rotor is attained only when necessary.

In accordance with still another aspect of the invention, fluxes in pole faces of the motor core are equalized despite uneven excitation of magnetic fluxes in pole faces feeding flux into the rotor. This feature is achieved by providing a relatively low resistivity slotted ring in the vicinity of the pole faces and rotor. The low resistivity ring functions in a manner similar to a transformer winding to intercept leakage flux resulting from uneven flux excitation so that a current is induced in the ring. In response to the current induced in the ring, fluxes are produced in the pole faces and the rotor does not have a tendency to be torqued under steady state conditions while a constant magnetic flux is being supplied thereto. The conducting ring enables windings carried on legs of the magnetic core feeding fluxes through the pole faces to opposite sides of the rotor to be wound in a relatively imprecise manner, obviating the need for the windings to have exactly the same number of turns.

In addition, the conducting ring enables a single coil to be utilized to excite a permanent magnet rotor of a step motor even though the coil is displaced by different amounts from pole faces of the motor core.

In accordance with another feature of the invention, rotation of the permanent magnet rotor can be effected in response to oppositely directed magnetic fields without the need for flux delaying shading rings. In accordance with one embodiment, pole faces of the motor core are extended circumferentially about a portion of the magnetic rotor. The extended portions have a lateral dimension running parallel to the rotor longitudinal axis, and hence pole force area, less than the corresponding dimension and pole face area of main segments of the pole faces. Since the force applied to the rotor is greater while a transition is being made in the magnetic field flux direction than during steady state operation, the extended portions of the pole faces cause rotation of the rotor. During steady state operation the flux from the extended portion of the pole faces is not sufficient to torque the motor which is maintained in a braked condition by virtue of the flux flowing through the main portion of the pole faces. In accordance with another embodiment, the rotor is provided with major and minor permanent magnet poles. The minor permanent magnet poles enable the rotor to be driven in response to transient variations of the magnetic field applied to the rotor by the core, while the major permanent poles brake the rotor under steady state conditions.

It is, accordingly, an object of the present invention to provide a new and improved step motor driving circuit.

Another object of the invention is to provide a new and improved step motor driving circuit wherein a step motor need not include means external to the drive circuit for establishing a D.C. magnetic field in the motor core.

Still another object of the invention is to provide a step motor drive circuit wherein the need for an air gap in the step motor magnetic core is obviated.

A further object of the invention is to provide a drive circuit for a permanent magnet rotor step motor wherein the rotor is stepped twice each time a control switch is opened and closed.

An additional object of the invention is to provide a drive circuit for a permanent magnet rotor step motor utilizing a single on-off type switch for selectively supplying current in one direction to a coil of the motor and for controlling an electronic switch supplying current in the other direction to the motor coil.

Still another object of the present is to provide a step motor drive circuit requiring only a single transistor or other electronic switching device to control the direction of current applied to the motor rotor.

Yet another object of the present invention is to provide a permanent magnet rotor step motor braked in response to flux derived from the same winding as that employed for deriving rotor drive flux.

Yet another object of the invention is to provide a drive circuit for a permanent magnet rotor step motor wherein a single winding is responsive throughout its length to oppositely directed D.C. currents to maintain the rotor in a locked position, as well as to control rotation of the rotor.

A further object of the invention is to provide, in combination with a step motor having no permanent magnets or air gaps, a means for stepping the rotor once in response to each change in the direction of a magnetic field, and wherein the need for shading rings is obviated.

Still another object of the invention is to provide a new and improved means for equalizing the flux in pole faces of a magnetic core coupled to a permanent magnetic rotor of a step motor.

Yet another object of the invention is to provide a new and improved means for obviating the requirement for precisely the same number of turns to be wound on legs feeding flux into pole faces coupled to a permanent magnet rotor of a step motor.

Yet another object of the invention is to provide a new and improved means for enabling a single coil to energize a permanent magnet rotor step motor even though the reluctance of magnetic materials coupling the field from the coil to opposite faces adjacent the rotor is different.

The above and still further objects, features and advantages of the present invention will become apparent upon consideration of the following detailed description of several specific embodiments thereof, especially when taken in conjunction with the accompanying drawings, wherein:

FIG. 1 is a circuit diagram of one embodiment of the present invention utilizing a center tapped coil;

FIGS. 2 and 3 illustrate modifications of the basic circuit of FIG. 1;

FIG. 4 is a circuit diagram of still another embodiment of the present invention wherein a pair of coils are provided;

Figure 5:
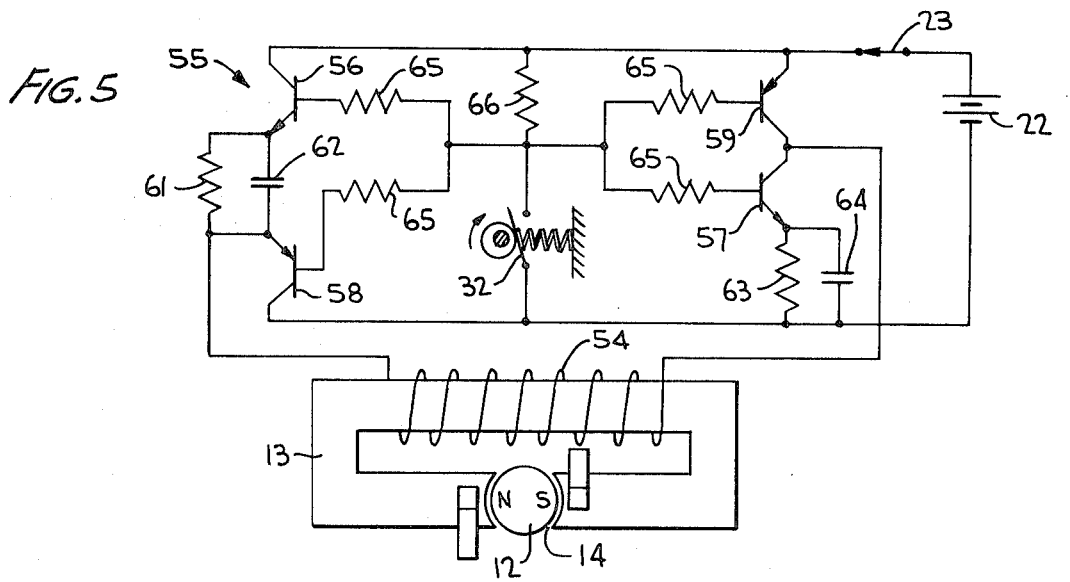
FIG. 5 is a circuit diagram of still a further embodiment of the invention wherein a single coil is employed.

Reference is now made specifically to FIG. 1 of the drawings wherein there is illustrated a step motor 11 having a permanent magnet rotor 12 and a laminated iron core 13 having only a single air gap 14 in which the permanent magnet rotor is positioned. Rotor 12 is positioned between pole faces 15 and 16 of core 13 and preferably includes a multiplicity of permanent magnet poles, although for purposes of simplicity a pair of poles is illustrated on opposite sides of the rotor, as indicated by the letters N and S on the drawings. Positioned in proximity to pole faces 15 and 16 are shading rings 17 and 18, respectively. Shading rings 17 and 18 delay flux applied by core 13 to rotor 12 so that the rotor can be rotated in response to a reversal of the direction of flux flowing between pole faces 15 and 16.

Magnetic flux is applied in opposite directions selectively between pole faces 15 and 16 by center tapped winding or coil 19. Center tap 21 of winding 19 is connected to the positive terminal of D.C. power supply 22 via power switch 23 and selectively feeds D.C. current to terminals 24 and 25 at opposite ends of the winding. Control of the direction of current flow through winding 19 is determined by the conducting state of NPN junction transistor 26 which functions effectively as a voltage controlled switch having a control electrode responsive to the level of the voltage applied to its base 27. The emitter 28 and collector 29 of transistor 26 are connected in series circuit with the half of winding 19 between center tap 21 and terminal 24, as well as with the voltage of D.C. power supply 22. Base emitter junction bias to transistor 26 is provided through the half of winding 19 connected between center tap 21 and terminal 25 from the positive terminal of power supply 22 and base current limiting resistor 31. The base emitter junction of transistor 26 is selectively short-circuited by switch 32, connected between terminal 25 and the negative terminal of D.C. power supply 22. Switch 32 is normally biased to an open circuit condition by spring 33 and is momentarily closed in response to engagement thereof by cam 34 driven by rotating shaft 35.

With switch 32 in the normal open-circuited condition, the positive voltage of D.C. power supply 22 is coupled through winding 19 between center tap 21 and terminal 25 to the base of transistor 27 to forward bias the transistor emitter collector path so that substantially a short circuit exists between collector 29 and emitter 28. Under such conditions, substantial D.C. current flows from center tap 21 to terminal 24 and magnetic flux flows in a clockwise direction about core 13 to electromagnetically maintain the north and south poles of permanent magnet rotor 12 in a locked or braked condition, with the south pole of the rotor adjacent pole face 16 and the north pole of the rotor adjacent pole face 15.

When switch 32 is activated to the closed position in response to suitable rotation of cam 34, the base 27 and emitter 28 are connected together and a zero potential subsists between them. In response to a zero potential existing across the emitter base junction of transmitter 26, the transistor is activated to a cut-off condition and substantially an open circuit exists from the positive terminal of D.C. source 22 through the portion of winding 19 between center cap 21 and terminal 24. Simultaneously, the impedance in the circuit connecting the positive and negative electrodes of D.C. source 22 between center tap 21 and terminal 25 of winding 19 is reduced substantially to a short circuit and substantial D.C. current flows in the winding between the center tap and terminal 25. In response to the D.C. current flowing between center tap 21 and terminal 25, the direction of flux in core 13 is switched from the clockwise direction to the counterclockwise direction. In response to the switching of flux from the clockwise to the counterclockwise direction, rotor 12 is rotated; in the specific two pole embodiment illustrated, the rotor undergoes 180° of rotation. Rotor 12 rotates in response to the change in direction of flux between pole faces 15 and 16 because shading rings 17 and 18 are provided in proximity to the pole faces. If the shading rings or some other equivalent type means were not provided, the magnetic field would simply reverse in the air gap 14 with no stepping of rotor 12 being effected. After rotor 12 has been rotated 180° it remains in situ due to the constant flow of magnetic flux through it and between pole faces 15 and 16. Rotor 12 thereby remains locked in place until the polarity of flux through air gap 14 is reversed again in response to switch 32 opening.

When switch 32 opens a positive bias is again applied to base electrode 27 of transistor 26 and substantially a short circuit is established between the transistor emitter and collector electrodes whereby sufficient current again flows in the counterclockwise direction about core 13 to step permanent magnet rotor 12 another 180°. Rotor 12 is continuously braked in the stated position until switch 34 again closes. It is noted that rotor 12 is continuously braked and incrementally rotated as required without the need for any permanent magnets in core 13; further, the core includes only one air gap 14 to maintain the rotor in a braked position.

To suppress transients that might be induced across electrodes of transistor 26 in response to sudden changes in current flowing through winding 19, diodes 36 and 37 are provided. Diodes 36 and 37 are normally back biased by connecting the cathode of each of them to center tap 21 and thence to the positive terminal of D.C. power supply 22. The anode of diode 36 is connected to terminal 25, while the anode of diode 37 is connected to terminal 24. Diodes 36 and 37 absorb positive current flowing from terminals 24 and 25 while current is being switched in winding 19 to provide short circuits about the windings and preclude the substantial flow of heavy transient currents from the windings to the base and collector electrodes of transistor 26.

To minimize the D.C. current applied by source 22 to winding 19 under steady state conditions while rotor 12 is electromagnetically braked, the circuit of FIG. 2 can be employed. In the circuit diagram of FIG. 2, as well as FIG. 3, there are illustrated only the circuit components, to the exclusion of the motor core and rotor to simplify the presentation. In the circuit illustrated by the diagram of FIG. 2, the bias circuit for the base emitter junction of transistor 26 is modified so that the D.C. current through the emitter collector path of the transistor is reduced once rotor 12 has been rotated without substantially affecting the current applied to winding 19 between center tap 21 and terminal 24 while the rotor is being driven.

To these ends, a resistive voltage divider comprising resistors 41 and 42 is connected between terminal 25 and the negative terminal of D.C. source 22. The common junction between resistors 41 and 42 is connected via capacitor 43 to terminal 25 and via resistor 44 to base electrode 27 of transistor 26. Base bias for transistor 26 is stabilized for steady state conditions by resistor 45, connected between base 27 and emitter 28.

In steady state conditions, the D.C. bias network including resistors 41, 42, 44 and 45 maintains a relatively low forward bias across the emitter base junction of transistor 26 so that the amount of current flowing through winding 19 between center tap 21 and terminal 24 is considerably less than that required to step rotor 12. The current flowing through winding 19 between center tap 21 and terminal 24 under steady state conditions, however, is adequate to maintain the rotor 12 electromagnetically braked and preclude rotation thereof. In response to switch 32 being closed, charge accumulated on capacitor 43 while switch 32 was open circuited is dissipated by the path including resistors 42, 44 and 45 so that transistor 26 is driven sharply into cut-off. While capacitor 43 is being discharged, current flows from center tap 21 to terminal 25 through switch 32 to produce a flux in a direction opposite from the flux produced while switch 32 is open circuited. Because switch 32 is normally short circuited for only short time durations, this current can be at a relatively high level without impairing efficiency of the unit.

Cam 33 opens circuits switch 32 after rotor 12 has been stepped in response to the current flowing from center tap 21 to terminal 25. In response to switch 32 being open circuited, a sudden decrease in the current supplied to capacitor 43 occurs to suddenly forward bias the base emitter junction of transistor 26. In response to the forward bias suddenly applied to the base emitter junction of transistor 26, substantially short circuited conditions are produced between emitter 28 and collector 29 so that a large current is suddenly applied to winding 19 between center tap 21 and terminal 24. In response to the relatively large current flowing between center tap 21 and terminal 24, a large flux is produced in air gap 14 to step rotor 12 180°. As time progresses, capacitor 43 is charged and the base emitter junction of transistor 26 is forward biased to a lesser extent, to increase the impedance between emitter 28 and collector 29. In response to the increased emitter collector impedance of transistor 26 the current in winding 19 between center tap 21 and terminal 24 decreases, to reduce the required steady state current in winding 19; the steady state current is, however, of sufficient magnitude to hold rotor 12 in situ.

Substantially the same result as is obtained with circuit of FIG. 2 is performed with the circuit of FIG. 3. In FIG. 3, the base bias circuit of transistor 26 is identical to that for the circuit illustrated by FIG. 1, but the emitter bias circuit for the transistor is modified. In particular, emitter 28 is connected to the negative terminal of D.C. source 22 via a relatively large, current limiting resistor 46, shunted by capacitor 47. While steady state conditions exist for rotor 12 in response to current flowing from center tap 21 to terminal 24 through the emitter collector circuit of transistor 26 a relatively large voltage drop exists between the emitter 28 and the negative terminal of source 22 through the voltage drop across resistor 46, that is also maintained across capacitor 47. Thereby, under steady state conditions, the current in winding 19 between center tap 21 and terminal 24 is at a relatively low level, only sufficient to electromagnetically brake rotor 12.

In response to switch 32 being closed, the base emitter junction of transistor 26 is back biased so that current flowing from emitter 28 to resistor 46 and capacitor 47 is substantially precluded. Capacitor 47 is thereby discharged through resistor 46 to reduce the voltage on emitter 28 substantially to the voltage at the negative terminal of source 22. While capacitor 47 is discharging through resistor 46, however, the positive bias applied by the capacitor voltage to emitter 28 maintains transistor 26 in a sharply cut-off condition and the magnetic flux resulting from current flowing between center tap 21 and terminal 25 is much greater than any flux which might be produced in response to current flowing between center tap 21 and terminal 24 immediately after closure of switch 32. Thereby, sufficient force is applied to rotor 12 to cause the rotor to be stepped 180°.

In response to switch 32 again being open circuited forward bias is suddenly applied to base electrode 27 of transistor 26 to establish substantially a short circuit between emitter 28 and collector 29. The sudden decrease in impedance level between emitter 28 and collector 29 results in a sudden increase in current flowing from center tap 21 to terminal 24 through the emitter collector path of transistor 26. The impedance of capacitor 47 to the sudden increase in current flowing from emitter 28 is relatively low so that the current flowing from center tap 21 to terminal 24 is large enough to supply sufficient flux to core 13 to enable rotor 12 to be stepped 180°. The relatively large current applied between center tap 21 and terminal 24 decreases in magnitude as capacitor 47 is charged; the current level is great enough to electromagnetically lock rotor 12 in place.

While the highly efficient steady state flux applying circuits of FIGS. 2 and 3 are illustrated specifically in conjunction with a circuit having the basic configuration illustrated by FIG. 1, it is to be understood that the biasing principles illustrated in FIGS. 2 and 3 are applicable to other modifications, of the type described infra.

Reference is now made to FIG. 4 of the drawings wherein there is illustrated a further embodiment of the present invention. In the embodiment of FIG. 4, the center tap winding of FIG. 1 is replaced with a pair of separate windings 51 and 52 mounted on core 13 in proximity to pole faces 15 and 16, respectively. By mounting windings 51 and 52 in proximity to pole faces 15 and 16 greater efficiency in coupling magnetic flux from the windings to rotor 12 is attained than with the circuit of FIG. 1 wherein the flux producing winding is mounted on a leg of the core remote from the pole faces.

A further modification of the circuit illustrated by FIG. 4 concerns connecting winding 52 between the emitter 28 of transistor 26 and the negative terminal of D.C. source 22. By connecting winding 52 in the emitter circuit of transistor 26, rather than the collector circuit thereof, the voltage supplied to the winding is reduced without affecting the current fed to the winding or the flux produced by the winding.

Still another embodiment of the invention is illustrated by the circuit diagram of FIG. 5. In FIG. 5, the center tap and split windings of the embodiments illustrated by FIGS. 1 and 4, respectively, are replaced by a single winding or coil 54 wound on a leg of core 13. Winding 54 is responsive to current supplied thereto in opposite directions to produce oppositely oriented fluxes in air gap 14 to rotate rotor 12. The oppositely directed currents flow through the entire length of winding 54, thereby to increase the amount of flux applied to rotor 12 for each turn in the winding so that the power requirements to brake and step rotor 12 are reduced.

To supply oppositely directed currents to winding 54, there is provided circuit 55 having a pair of NPN transistors 56 and 57 and a pair of complementary PNP transistors 58 and 59. The emitter collector paths of transistors 56 and 58 are connected in series with each other across the positive and negative terminals of D.C. power supply 22 so that the emitters of the transistors have a common connection established through the parallel combination of resistor 61 and capacitor 62. The emitter collector paths of transistors 57 and 59 are connected in series across the positive and negative electrodes of power supply 22 so that the collectors of these transistors have a common connection. The emitter of transistor 57 is connected through the parallel combination of resistor 63 and capacitor 64 to the negative terminal of D.C. power supply 22. The bases of transistors 56–59 are connected through current limiting resistors 65 and 66 to the positive electrode of source 22, while the negative electrode of the source is selectively connected to all of the transistor bases via normally open circuited switch contact 32 and resistor 65.

The positive voltage applied to the bases of transistors 56 and 57 under normal operating conditions while switch 32 is open circuited, maintains the emitter base junction of the NPN transistors in a forward biased condition. With transistors 56 and 57 forward biased, D.C. current flows from the positive terminal of D.C. source 22 through the emitter collector path of transistor 56 into the left end, as illustrated in FIG. 5, of the winding and out of the right end of the winding through the emitter collector path of transistor 57. Under steady state conditions, the current flowing through winding 54 from left to right is sufficient to maintain rotor 12 in an electromagnetically braked or locked condition. Due to the biasing networks including resistors 61 and 63 and capacitors 62 and 64, similar to the biasing circuit illustrated by FIG. 3, the steady state current through winding 54 is maintained at a relatively low level but is switched during transient operation to a sufficiently high level to produce sufficient flux in core 13 to rotate rotor 12.

In response to switch 32 being closed the voltage at the negative terminal of D.C. source 22 is applied to the bases of transistors 56–59 to back bias the emitter base junctions of transistors 56 and 57, while forward biasing the emitter base junction of transistors 58 and 59. In response to transistors 56 and 57 being back biased, D.C. current flow from the positive electrode of source 22 to the left end of winding 54 ceases. In response to transistors 58 and 59 being forward biased, D.C. current flows from the positive terminal of D.C. source 22 through the emitter collector path of transistor 59 into the right side of winding 54, from the left side of the winding and through the emitter collector path of the transistor 58.

The magnitude of the current supplied through the emitter collector path of transistor 58 and 59 that flows from the right end of winding 54 is sufficient to produce a flux having a magnitude great enough to rotate rotor 12. Rotor 12 is maintained in a locked condition in response to the flux existing across air gap 14 in response to the current flow occuring while transistors 58 and 59 are in a conducting state. Since switch 32 is closed for only relatively short time durations, there is no need to limit the steady state current through transistors 58 and 59 to optimize efficiency.

Figure 6:
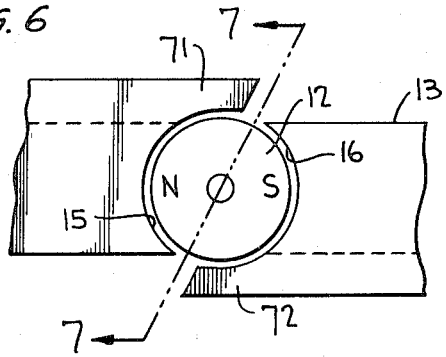
FIG. 6 is a side view of the pole faces of a modified step motor responsive to the drive circuit of the invention.
Figure 7:
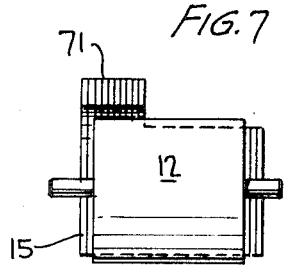
FIG. 7 is a view taken through the lines 7—7, FIG. 6, to illustrate the relative cross-sectional areas of pole face segments utilized in the embodiment of FIG. 6.

Reference is now made to FIGS. 6 and 7 of the drawings wherein there is illustrated a modification of core 13 obviating the need for flux delaying shading rings 17 and 18. In the embodiment illustrated by FIGS. 6 and 7, rotational force is applied by the magnetic flux of core 13 to step rotor 12 by providing extended pole face segments 71 and 72. Pole face segments 71 and 72 extend circumferentially about rotor 12 by an angle of approximately 120° from the center of the main portion of pole faces 15 and 16. Each of pole face segments 71 and 72 has a lateral extent running in the direction parallel to the axis of rotor 12 less than the lateral extent of the main segments of pole faces 15 and 16, and thereby have a smaller area than the main segments. Each of the auxiliary pole faces 71 and 72 preferably is aligned in a plane running at right angles to the sheet, as viewed in FIG. 6, so that maximum coupling of flux between them and rotor 12 occurs. In response to a flux reversal applied to the pole faces, the extended pole segments 71 and 72 pull rotor 12 to step the rotor 180°. When steady state conditions are reached, the majority of the flux flows between the major pole face segments because of the larger area thereof than pole face segments 71 and 72 and any tendency of the rotor 12 to be stepped in response to flux flowing between the segmented pole faces 71 and 72 is overcome by the flux in the large area pole face segments.

The embodiment of FIGS. 6 and 7 does not require flux flow delay in order to rotate rotor 12 so that the rotor can be stepped at a higher velocity than with the shading ring arrangement specifically illustrated in FIGS. 1, 4 and 5. In addition, in response to differing rates of flux reversal applied to air gap 14 because of intermittent opening and closing of switch 32, rotor 12 is stepped at a constant rate each time a flux reversal occurs, which may not occur with the shading ring arrangement because of the flux delay associated therewith. The embodiment of FIGS. 6 and 7 has the added advantage of being very easily fabricated in a laminated structure.

Figure 8:
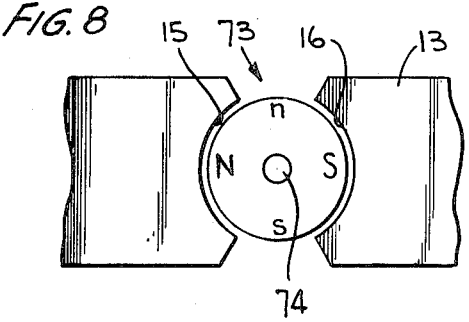
FIG. 8 is a side view of a rotor in accordance with another embodiment of the present invention.
Figure 9:
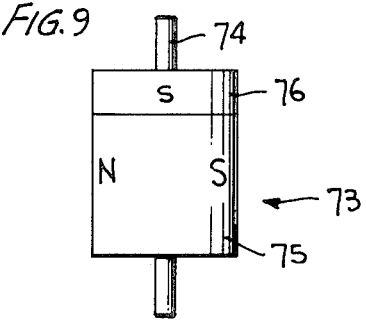
FIG. 9 is a plan view of a rotor of the type illustrated in FIG. 8.

Still another embodiment for stepping a rotor controlled with the circuit of the present invention is illustrated in FIGS. 8 and 9. In the embodiment of FIGS. 8 and 9 the shading ring construction need not be employed, while the extended pole face arrangement can be employed if desired. In the embodiment of FIGS. 8 and 9, rotor 73 is provided with a pair of major permanent magnet poles, indicated on the drawings by the large letters N and S, as well as a pair of minor permanent magnet poles, indicated on the drawings by the smaller letters $n$ and $s$. The major and minor permanent magnet poles are illustrated as being mutually orthogonal so that they extend in a direction running parallel to the rotor longitudinal axis coincident with shaft 74. The permanent magnet poles of rotor 73, however, are not necessarily displaced from the major permanent magnet poles by 90°. In fact, a 45° displacement between adjacent like polarity permanent magnet poles may be preferable because of the increased repulsive force which can be attained thereby during stepping of the rotor.

In accordance with the embodiment illustrated in FIG. 8, the major and minor magnetic poles are formed by using a single rotor having the major and minor permanent magnet poles impressed thereon by a special magnetizing fixture. In the alternative, a pair of rotor segments 75 and 76, as illustrated in FIG. 9, can be employed to establish the major and minor permanent magnetic poles. Cylindrical segment 75 carries the major poles and has a face thereof in abutting relationship with a face of cylindrical rotor segment 76. The two abutting faces of rotor segments 75 and 76 are bonded together by any suitable means in such a manner that the north and south poles of segment 75 are suitably displaced relative to the north and south poles of segment 76.

The embodiment of FIGS. 8 and 9 also obviates the need for shading rings and the inherent flux delay disadvantages associated therewith. Hence, the same advantages as set forth with regard to FIGS. 6 and 7 are achieved with the embodiment of FIGS. 8 and 9.

In operation, the rotor of FIGS. 8 and 9 is stepped in response to flux reversals applied between pole faces 15 and 16 due to the interaction of the minor permanent magnet poles with the changing flux. While the flux is changing, it produces a force of greater magnitude than the steady state force on minor permanent magnet pole pieces in rotor 73 to repel the rotor minor pole pieces into alignment with the center of core pole faces 15 and 16.

In the two embodiments illustrated by FIGS. 6 – 9 for activating rotor 12 the offset effect of the magnetic field of the rotor or core causes a repulsive force between the rotor and core poles to provide a significant turning moment to the rotor. This can be seen by considering the flux flow in the arrangement of FIG. 8 wherein, under steady state conditions, the flux in core 13 produces a south magnetic pole in pole face 15 and a north magnetic pole in pole face 16. The north and south poles in pole faces 15 and 16 resulting from flux applied to core 13 maintains rotor 73 in a braked or locked condition. In response to a change in the magnetic flux direction flowing between pole faces 15 and 16, a north magnetic pole is produced in pole face 15, while a south magnetic pole occurs in pole face 16. The north pole in pole face 15 repels the minor permanent magnet north pole of rotor 73 to torque the rotor in a first direction about its shaft. Similarly, the south pole in pole face 16 repels the minor south pole of rotor to torque the rotor in said first direction so that the rotor is stepped. The torques produced by the major permanent magnets interacting with fluxes derived from pole faces 15 and 16 are oppositely directed so that the rotor is not stepped in response to them.

Figure 10:
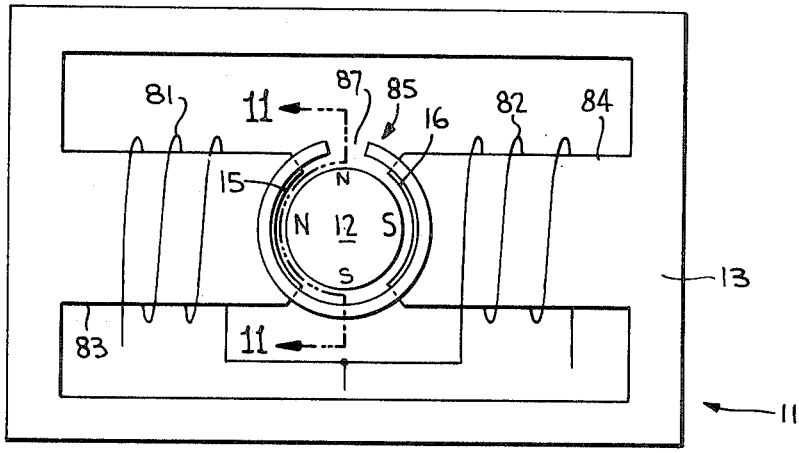
FIG. 10 is a front view of still another embodiment of the invention wherein a conducting strap is employed to equalize fluxes in opposed legs of a magnetic core for motor.
Figure 11:
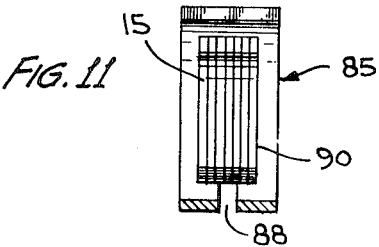
FIG. 11 is a view taken through the lines 11—11 of FIG. 10 to provide an illustration of the manner by which a conducting strap and an iron core are fitted together.
Figure 12:
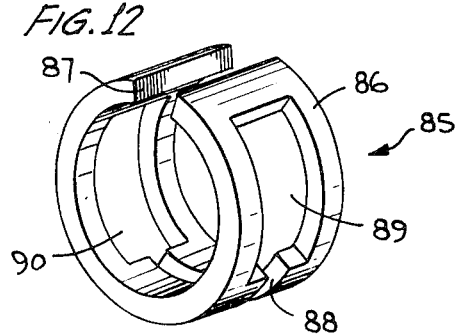
FIG. 12 is a perspective view of the conducting strap employed in the embodiments illustrated by FIGS. 10 and 11.

In accordance with another aspect of the invention, specifically illustrated in FIGS. 10 – 12, the magnetic flux flowing through pole faces 15 and 16 is maintained equal, even though unequal flux excitation of core legs terminating in pole faces occurs. Excitation of pole faces 15 and 16 in the embodiments of FIGS. 10 – 12 is in response to current being supplied to coils or windings 81 and 82 on legs 83 and 84 of core 13. Windings 81 and 82 can be center taped as illustrated if the circuits of FIGS. 1 – 3 are connected thereto or the center tap can be eliminated if the drive circuit of FIG. 5 is employed. In the alternative windings 81 and 82 can be separate and excited in the manner illustrated by FIG. 4.

Unequal flux excitation in legs 83 and 84 can occur if coils or windings 81 and 82 having differing numbers of turns are wound on legs 83 and 84 of core 13 in proximity with rotor 12, or because of differences or imbalances in reluctance paths of the core between points of electromagnetic excitation and pole faces 15 and 16. Flux flow through the pole faces 15 and 16 is maintained substantially equal despite unequal excitation of windings 81 and 82 by placing a relatively low resistivity loop or strap 85 over pole faces 15 and 16 in close proximity to rotor 12. For purposes of simplicity, rotor 12 is illustrated as being of the type illustrated in FIGS. 8 and 9, but it is to be understood that the pole faces 15 and 16 can be modified as illustrated in FIGS. 6 and 7, or that shading rings can be also included.

Low resistivity loop or strap 85, preferably fabricated from a material such as copper, aluminum or silver, comprises a ring 86 having a slot 87 running parallel to the ring longitudinal axis and extending through the entire thickness of the ring. Circumferential slot 88, having an angular extent of slightly less than 180° divides ring 86 into a pair of conducting segments. At the ends of slot 88, rectangular cut-outs 89 and 90 are provided to enable pole faces 15 and 16 to extend through ring 86 into close proximity with rotor 12. In addition to enabling close magnetic coupling to be achieved between core 13 and rotor 12, the cut-outs 89 and 90 provide close magnetic coupling between the core and ring 86 so that the ring can function in a manner similar to a turn of a transformer winding.

If windings 81 and 82 are excited in such a manner that unequal magnetic fluxes flow into and out of pole faces 15 and 16 leakage occurs in the air gap 14 between the pole faces and rotor 12. In accordance with the present invention compensation for the unequal flux flow in pole faces 15 and 16 resulting from diverse flux flow excitation to pole faces 15 and 16 is provided by strap 85. In response to unequal flux flow in faces 15 and 16 a current is induced in ring 86 due to the magnetic lines of flux crossing ring 86 in the portion of air gap 14 between pole faces 15 and 16. In response to the current induced in ring 86 a flux is produced in pole faces 15 and 16 to induce opposite polarity currents in windings 81 and 82. The currents induced in the winding 81 and 82 are of such polarity as to tend to equalize flux in legs 83 and 84.

To consider a specific example, assume that coil 81 has one turn, while coil 82 has two turns, that equal switching currents are supplied to the two coils and that strap 85 is not included. Under such conditions, the A.C. flux about leg 84 is twice that about leg 83. The magnetic potential of the pole face 16 is much higher relative to the ferromagnetic frame 13 than pole face 15 and while these pole faces are magnetically coupled one to the other the leakage flux from face 16 to frame 11 and to surfaces of leg 83 other than pole face 15 are substantial. Under this circumstance, considerably more flux flows from pole 16 than through pole 15. In accordance with the present invention wherein strap 85 is provided, all of the A.C. flux flowing from pole 16 while rotor 12 is being driven induces a voltage in strap 85. The A.C. flux through pole 15, due to the aforementioned difference in magnetic potential of it relative to pole 16 is less than the A.C. flux flow through pole 16, whereby the induced voltage at pole 15 is less than the induced voltage at pole 16. The higher induced voltage at pole 16 causes A.C. current flow in a direction to increase A.C. flux flow in pole 15.

The low resistivity strap illustrated in FIG. 6 can also be employed in conjunction with a step motor having a magnetic core 91 shaped generally like a wheel, with a pair of aligned spokes 95 and 97 connected together by annular outer rim 92. On spoke 95 is wound coil 96 which can be centered tapped, segmented or continuous without a tap, but is excited with opposite polarity currents in accordance with a circuit of the type illustrated by any of FIGS. 1 – 5.

Figure 13:
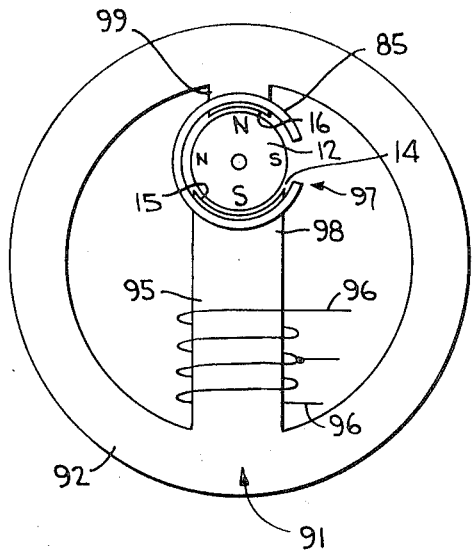
FIG. 13 is a front view of still another embodiment employing a conductive strap and having only a single winding.

Segmented spoke 97, comprising stub arms 98 and 99 and air gap 14, extends between the center of core 91 and rim 92 and is aligned with spoke 95. At the ends of arms 98 and 99 are located curved pole faces 15 and 16 to form air gap 14 in which permanent magnet rotor 12 is disposed. Ring 85, as illustrated in FIG. 12, fits on pole pieces 15 and 16 in the same manner as illustrated in FIG. 10 to couple magnetic flux equally to both pole faces 15 and 16 of spoke 97 despite the difference in distance and magnetic reluctance between the two pole faces and excitation coil 96. Hence, strap 85 forms basically the same function as described supra with regard to FIGS. 10 – 12 in that unequal flux excitation in legs 98 and 99 generally occurs. While a circular configuration is illustrated in FIG. 13, it is to be understood that the core could be of the square, rather than circular type, if less efficient flux coupling can be tolerated.

While there has been described and illustrated several specific embodiments of the invention, it will be clear that variations in the details of the embodiments specifically illustrated and described may be made without departing from the true spirit and scope of the invention as defined in the appended claims.

I claim:

1. A circuit responsive to current derived from a D.C. source for driving a step motor having excitation winding means and a permanent magnet rotor comprising voltage responsive switch means including a control electrode for selectively controlling a conducting path of the switch means to closed and open circuit conditions, a pair of contacts selectively connected together for selectively controlling bias voltage applied to the control electrode to control the conducting state of the switch means, and means for connecting in circuit with each other said contacts, the switch means conducting path, winding means and D.C. source so that in response to the contacts not being connected together the switch means conducting path is closed and current flows from the source through the switch means conducting path to the winding means in a first direction and in response to the contacts being connected together the switch means conducting path is open circuited and current flows from the source through the contacts to the winding means in a second direction, whereby the rotor is stepped each time the state of the contacts is changed.

2. A circuit responsive to current derived from a D.C. source for driving a step motor having excitation winding means and a permanent magnet rotor comprising an electric discharge device including a control electrode and a pair of output terminals, said control electrode being selectively forward biased in response to the conducting state of a pair of selectively open and closed contacts, whereby high and low impedance paths exist through the discharge device between the output terminals while the contacts are respectively closed and open, means for connecting said winding means and said closed contacts in series circuit with the output terminals and D.C. source so that current flows from the D.C. source through the winding means in a first direction while the low impedance path exists, and means for connecting the winding means in series circuit with the D.C. source and closed contacts so that current flows from the D.C. source through the winding means in a second direction while the high impedance path exists.

3. In combination, a step motor having a permanent magnet rotor, a magnetic core for coupling magnetic flux to said rotor, winding means on said core, circuit means for sequentially feeding oppositely directed currents to said winding means to induce oppositely directed fluxes in said core and rotor, means in at least one of the core or rotor for stepping the rotor in response to each change in the direction of the fluxes in said core and rotor, said circuit means including two position switch means having first and second contacts selectively open and short circuited for controlling a D.C. current continuously fed in only one direction to the winding means while the first and second contacts are open circuited and for controlling a D.C. current continuously fed in only the other direction to the winding means while the first and second contacts are short circuited, said D.C. currents being maintained until each change in the current direction occurs and of sufficient magnitude to induce a flux in the core and rotor to electromagnetically brake the rotor, said D.C. currents reversing the flux direction each time the current direction is changed, said circuit means further including means for supplying a current of greater amplitude to the winding means while the rotor is being stepped than the D.C. current supplied to the winding means to brake the rotor.

4. The combination of claim 3 wherein said current supplying means includes: a voltage controlled impedance having a control electrode responsive to the condition of said switch, and resistance capacitance charging circuit means controlling the voltage magnitude applied to the control electrode.

5. In combination, a step motor having a permanent magnet rotor, a magnetic core for coupling magnetic flux to said rotor, winding means on said core, circuit means for sequentially feeding oppositely directed currents to said winding means to induce oppositely directed fluxes in said core and rotor, means in at least one of the core or rotor for stepping the rotor in response to each change in the direction of the fluxes in said core and rotor, said circuit means including two position switch means having first and second contacts selectively open and short circuited for controlling a D.C. current continuously fed in only one direction to the winding means while the first and second contacts are open circuited and for controlling a D.C. current continuously fed in only the other direction to the winding means while the first and second contacts are short circuited, said D.C. currents being maintained until each change in the current direction occurs and of sufficient magnitude to induce a flux in the core and rotor to electromagnetically brake the rotor, said D.C. currents reversing the flux direction each time the current direction is changed, said winding means including first and second segments, said circuit means further including: means for feeding a current in one direction to only said first segment during a first time interval and means for feeding a current in a direction opposite to the first direction to only the second segment during a second time interval.

6. The combination of claim 5 wherein the core includes a pair of pole faces on opposite sides of the rotor, and further including a low resistivity strap fitting over both said pole faces and intercepting leakage magnetic flux flowing from one pole face but not into the other pole face, said strap having slot means so that current is induced therein by the intercepted leakage flux, said strap interfitting with the pole faces so the current induced in the strap has a tendency to substantially equalize fluxes in the pole faces.

7. The combination of claim 6 wherein said winding means comprises a pair of coils, each wound on a different leg feeding flux to the pole faces on opposite sides of the rotor.

8. The combination of claim 6 wherein said winding means comprises a single coil wound on a leg feeding flux to the pole faces on opposite sides of the rotor, the magnetic reluctance of the core from the coil to the two different pole faces being different.

9. The combination of claim 6 wherein the circuit means further includes resistance capacitance network means in a bias circuit for control electrodes of both transistors of one of the pairs of switches, said resistance capacitance network means varying the impedance of the transistor of said one of said switches so that the current supplied between said ends is greater while the rotor is being stepped in response to current flowing between said ends than the current supplied between said ends while the rotor is braked by the current flowing between said ends.

10. The combination of claim 5 wherein the circuit means includes a single voltage controlled switch having a control electrode responsive to the condition of the switch means and a pair of terminals connected in series between a D.C. source and one of the winding segments.

11. The combination of claim 5 wherein the other winding segment is connected between one of the terminals and a control electrode of the voltage controlled switch and in series between the D.C. source and a control switch, said control switch being connected between the control electrode and other terminal of the voltage controlled switch.

12. The combination of claim 6 further including a resistance capacitance circuit in a bias network for the control electrode of the voltage controlled switch, said resistance capacitance circuit varying the impedance of the voltage controlled switch between said terminals so that the current supplied to said one winding segment is greater while the rotor is being stepped in response to current flowing through said one winding segment than the current supplied to said one winding segment while the rotor is braked by the current flowing through said one segment.

13. In combination, a step motor having a permanent magnet rotor, a magnetic core for coupling magnetic flux to said rotor, winding means on said core, circuit means for sequentially feeding oppositely directed currents to said winding means to induce oppositely directed fluxes in said core and rotor, means in at least one of the core or rotor for stepping the rotor in response to each change in the direction of the fluxes in said core and rotor, said circuit means including two-position switch means having first and second contacts selectively open and short circuited for controlling a D.C. current continuously fed in only one direction to the winding means while the first and second contacts are open circuited and for controlling a D.C. current continuously fed in only the other direction to the winding means while the first and second contacts are short circuited, said D.C. currents being maintained until each change in the current direction occurs and of sufficient magnitude to induce a flux in the core and rotor to electromagnetically brake the rotor, said D.C. currents reversing the flux direction each time the current direction is changed, the circuit means including: a first pair of voltage controlled switches for feeding current in one direction from a D.C. source between said first and second ends, and a second pair of voltage controlled switches for feeding current in a second direction from the D.C. source between said first and second ends; and control means for enabling both switches of the first pair while disabling both switches of the second pair or for disabling both switches of the first pair while enabling both switches of the second pair, each switch of said first pair of switches comprising a transistor of a first conductivity type, each switch of said second pair of switches comprising a transistor of a second conductivity type, said first and second conductivity types being opposite from each other, said control means including said two-position switch means for selectively connecting control electrodes of said transistors to be responsive to voltages of opposite polarities derived from the D.C. source, one contact of said switch means being directly connected to the control electrodes of all of said transistors.

14. The combination of claim 13 wherein the core includes a pair of pole faces on opposite sides of the rotor, and further including a low resistivity strap fitting over both said pole faces and intercepting leakage magnetic flux flowing from one pole face but not into the other pole face, said strap having slot means so that current is induced therein by the intercepted leakage flux, said strap interfitting with the pole faces so the current induced in the strap has a tendency to substantially equalize fluxes in the pole faces.

15. The combination of claim 14 wherein said winding means comprises a pair of coils, each wound on a different leg feeding flux to the pole faces on opposite sides of the rotor.

16. The combination of claim 14 wherein said winding means comprises a single coil wound on a leg feeding flux to the pole faces on opposite sides of the rotor, the magnetic reluctance of the core from the coil to the two different pole faces being different.

17. The combination of claim 14 wherein the slot means includes a first slot extending longitudinally of the strap between the pole faces to divide the strap into first and second segments extending for the entire distance between edges of the two pole faces, said first and second segments being joined after passing the edges of the two pole faces to form a pair of joining segments, said pair of joining segments being separated by a second slot in the strap.

18. In combination, a step motor having a permanent magnet rotor, a magnetic core for coupling magnetic flux to step the rotor in response to changes in the direction of flux flowing from the core to the rotor, winding means on said core for inducing a magnetic flux in the core, circuit means connected to said winding means for supplying current to said winding means to induce oppositely directed first and second fluxes in the core to rotate the rotor, said circuit means including: switch means having a voltage responsive control electrode for controlling current flow between a pair of output terminals, means for selectively applying a bias voltage to the control electrode to provide high and low impedance paths through the switch means between the pair of output terminals, first circuit means connecting said pair of output terminals in series with said winding means and a D.C. source for continuously supplying current to the winding means in a direction to induce a flux in the rotor in the first direction while the low impedance path exists through the switch means, and second circuit means connecting said winding means and the D.C. voltage source in series for continuously supplying current to the winding means in a direction to induce a flux in the rotor in the second direction only while the high impedance path exists through the switch means, wherein said winding means includes first and second winding segments, said first circuit means including means for connecting the pair of terminals of the switch means in series with the source and first winding segment to the exclusion of the second winding segment, said second circuit means including means for applying the bias voltage to the control electrode from the D.C. source through the second winding segment.

* * * * *

UNITED STATES PATENT OFFICE
CERTIFICATE OF CORRECTION

Patent No. 3,720,864            Dated March 13, 1973

Inventor(s) Walter Kohlhagen

It is certified that error appears in the above-identified patent and that said Letters Patent are hereby corrected as shown below:

On the title page the inventor's name should be corrected from "Kolhagen" to --Kohlhagen--.

On each sheet of drawings the inventor's name should be corrected from "Kolhagen" to --Kohlhagen--.

Claim 2, line 45, delete "and said closed contacts";

line 52, after "means" insert --and said closed contacts--.

Signed and sealed this 12th day of November 1974.

(SEAL)
Attest:

McCOY M. GIBSON JR.          C. MARSHALL DANN
Attesting Officer            Commissioner of Patents